(12) United States Patent
Inami et al.

(10) Patent No.: US 10,500,619 B2
(45) Date of Patent: Dec. 10, 2019

(54) ROLLING SYSTEM

(71) Applicant: TOSHIBA MITSUBISHI-ELECTRIC INDUSTRIAL SYSTEMS CORPORATION, Chuo-ku (JP)

(72) Inventors: Haruki Inami, Tokyo (JP); Naohiro Kubo, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 521 days.

(21) Appl. No.: 15/302,297

(22) PCT Filed: Apr. 23, 2014

(86) PCT No.: PCT/JP2014/061448
§ 371 (c)(1),
(2) Date: Oct. 6, 2016

(87) PCT Pub. No.: WO2015/162728
PCT Pub. Date: Oct. 29, 2015

(65) Prior Publication Data
US 2017/0028452 A1   Feb. 2, 2017

(51) Int. Cl.
*B21B 1/26* (2006.01)
*B21C 51/00* (2006.01)
(Continued)

(52) U.S. Cl.
CPC .............. *B21B 1/26* (2013.01); *B21B 37/74* (2013.01); *B21B 37/76* (2013.01); *B21C 51/00* (2013.01);
(Continued)

(58) Field of Classification Search
CPC ........... B21B 1/26; B21B 37/00; B21B 37/74; B21B 2203/00; B21B 38/006;
(Continued)

(56) References Cited

U.S. PATENT DOCUMENTS 5,990,464 A * 11/1999 Hino .................... B21B 1/26
                                                219/602
6,891,139 B2 * 5/2005 Iijima .................. H05B 6/06
                                                219/667

FOREIGN PATENT DOCUMENTS

JP    62-185829 A    8/1987
JP    10-128423 A    5/1998
(Continued)

OTHER PUBLICATIONS

International Search Report dated Jul. 15, 2014 in PCT/JP2014/061448 filed Apr. 23, 2014.

*Primary Examiner* — Shelley M Self
*Assistant Examiner* — Timothy Eason
(74) *Attorney, Agent, or Firm* — Oblon, McClelland, Maier & Neustadt, L.L.P.

(57) ABSTRACT

A rolling system includes an induction heater, temperature detectors, a finishing mill, and a power setting calculation device. The power setting calculation device generates a temperature distribution pattern in a plate thickness direction of a steel material at a temperature control position in an upstream side. The power setting calculation device calculates a volume average temperature of the steel material at a temperature control position in a downstream side, at a time when the steel material moves to the temperature control position in the downstream side from the temperature control position in the upstream side, based on the generated temperature distribution pattern. Then, the power setting calculation device calculates an electric power necessary for the induction heater so that the calculated volume average temperature follows a target temperature of the steel material at the temperature control position in the downstream side.

7 Claims, 5 Drawing Sheets

No. 7 : POWER SETTING CALCULATION DEVICE
No. 8 : POWER CONTROLLING DEVICE
No. 12: TEMPERATURE-RISE PATTERN SETTING DETERMINATION DEVICE (51) Int. Cl.
    *B21B 37/76* (2006.01)
    *C21D 1/42* (2006.01)
    *C21D 11/00* (2006.01)
    *B21B 37/74* (2006.01)
    B21B 45/00 (2006.01)
    B21B 38/00 (2006.01)

(52) U.S. Cl.
    CPC ............... *C21D 1/42* (2013.01); *C21D 11/00* (2013.01); *B21B 38/006* (2013.01); *B21B 45/004* (2013.01); *Y02P 10/253* (2015.11)

(58) Field of Classification Search
    CPC ... B21B 2261/20; B21B 2261/21; C21D 1/42; C21D 8/00–8/1294; C21D 9/60; G01K 5/48; H05B 6/06; H05B 6/36; H05B 6/145
    USPC ............... 72/6.1–14.7; 148/520; 700/153; 219/216, 619; 266/80, 87
    See application file for complete search history.

(56) References Cited

FOREIGN PATENT DOCUMENTS

| | | |
|---|---|---|
| JP | 2003-275804 A | 9/2003 |
| JP | 2005-68553 A | 3/2005 |
| JP | 2010-247234 A | 11/2010 |
| JP | 4631247 B2 | 2/2011 |

* cited by examiner

*FIG. 1*

No. 7 : POWER SETTING CALCULATION DEVICE
No. 8 : POWER CONTROLLING DEVICE
No. 12: TEMPERATURE-RISE PATTERN SETTING DETERMINATION DEVICE

ROLLING SYSTEM

FIELD

The present invention relates to a rolling system which includes an induction heater.

BACKGROUND

Generally, an induction heater has such features as being excellent in energy-saving properties, being capable of heating a material rapidly, showing satisfactory temperature controllability and responsiveness, and providing a good working environment, as compared to other heaters.

If the induction heater is used in a rolling line (for instance, a hot rolling line), a skid mark on a rough bar can be reduced, and the precision of a plate thickness and a plate width over the whole length of the material can be increased. In addition, if low-temperature take-out from a heating furnace and compensation for thermal run down are also employed, high-speed rolling from the head to the tail end of the material is enabled. When a temperature of the tail end of the material is raised by the induction heater, it becomes possible even for a material which has not been rolled so far (for instance, a thin and long material), to be rolled. The induction heater has such various advantages, and accordingly various methods of using the induction heater are proposed for each facility, and are actually applied to each facility.

For instance, PTL 1 describes a method of controlling a surface temperature of a material at the time immediately after the material has passed through the induction heater to a certain target temperature or higher, and controlling an internal temperature of the material at the time to a certain target temperature or lower, by heating the material by the induction heater.

CITATION LIST

Patent Literature

[PTL 1] Japanese Patent No. 4631247

SUMMARY

Technical Problem

In a rolling line, it is important that the temperature of a material is kept in a desired range, in an exit side of a finishing mill. In order that the temperature of the material is controlled to the desired range in the exit side of the finishing mill, the temperature of the material in an entry side of the finishing mill must be accurately controlled. If the temperature of the material can be accurately controlled in the entry side of the finishing mill, the temperature of the material in the exit side of the finishing mill becomes stable.

PTL 1 does not disclose a specific content of how to stabilize the temperature of the material in the entry side of the finishing mill. There is a fixed distance between the induction heater and the finishing mill. After the material has passed through the induction heater, the temperature of the material results in changing due to heat conduction in the inside of the material, the escape of heat to a table roll of a conveying table, air convection and the like.

The present invention is achieved to solve the above described problems. An object of the present invention is to provide a rolling system which can control an induction heater so that a material becomes an optimal temperature in an entry side of a finishing mill.

Solution to Problem

A rolling system of the present invention comprises an induction heater which heats a material that is conveyed by a conveying table, a first temperature detector which detects a temperature of the material at a first position upstream from the induction heater, a finishing mill which is provided downstream from the induction heater, and rolls the material, a second temperature detector which detects a temperature of the material at a second position downstream from the induction heater and upstream from the finishing mill, and a power setting calculation device which calculates an electric power necessary for the induction heater. The power setting calculation device comprises generation means for generating a temperature distribution pattern in a plate thickness direction of the material at the first position, on the basis of the temperature detected by the first temperature detector, first calculation means for calculating a volume average temperature of the material at the second position, at a time when the material moves to the second position from the first position, on the basis of the temperature distribution pattern generated by the generation means, and second calculation means for calculating the electric power necessary for the induction heater so that the volume average temperature calculated by the first calculation means follows a target temperature of the material at the second position. The first calculation means divides the material into nodes in the plate thickness direction, calculates a change of a temperature of each node on the basis of radiation cooling, escape of heat due to air convection, escape of heat to a table roll of the conveying table, heat conduction occurring due to a temperature difference between the node and its adjacent node, and a change of a calorific value from the induction heater, and calculates the volume average temperature of the material on the basis of the calculated result.

Advantageous Effects of Invention

The rolling system according to the present invention can control the induction heater so that a material becomes an optimal temperature in an entry side of a finishing mill.

DESCRIPTION OF EMBODIMENTS

The present invention will be described with reference to the accompanying drawings. Redundant descriptions are appropriately simplified or omitted. In each of the drawings, identical reference numerals refer to identical or corresponding parts.

Embodiment 1

Figure 1:
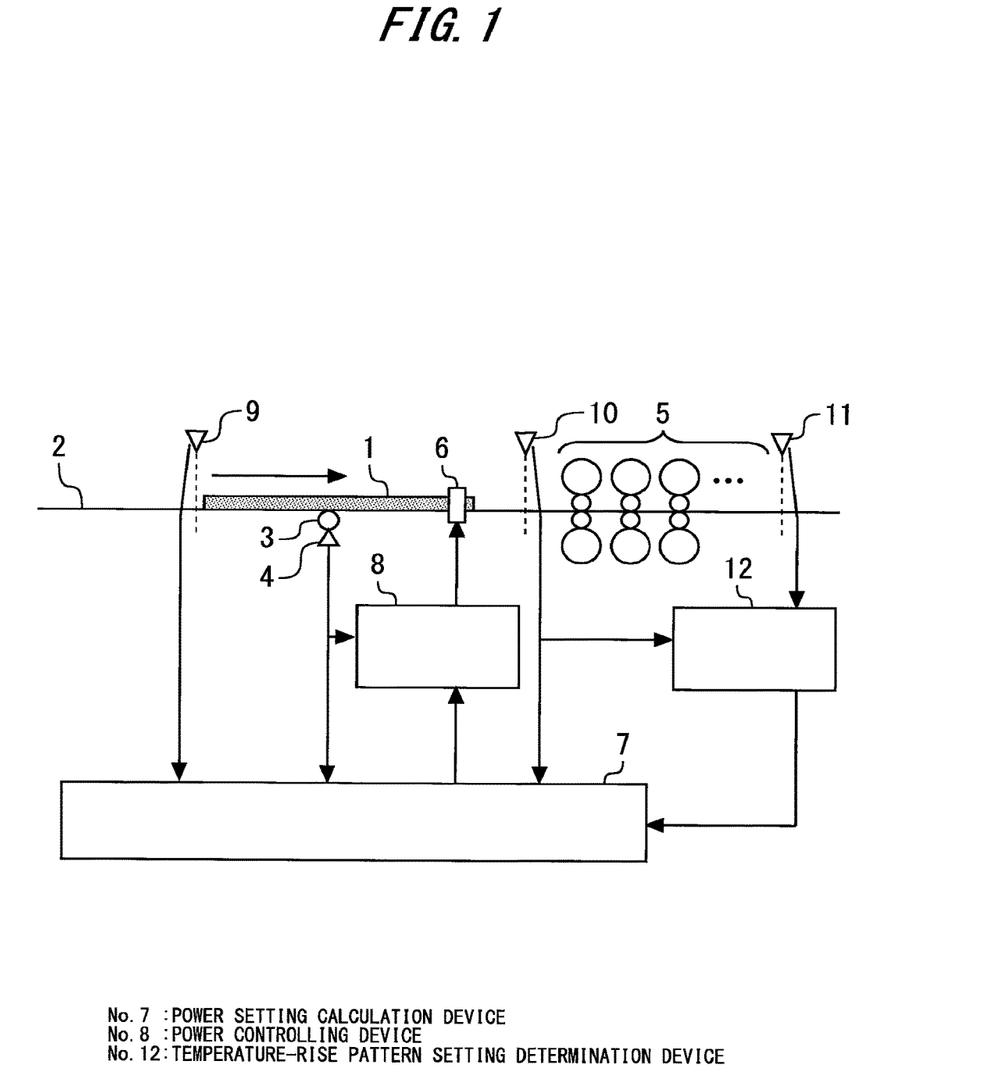
FIG. 1 is a block diagram showing a rolling system in Embodiment 1 of the present invention.

FIG. 1 is a block diagram showing a rolling system in Embodiment 1 of the present invention. A hot rolling line is shown as one example of a rolling line.

The hot rolling line rolls a steel material 1 while conveying the steel material (material) 1 with a conveying table 2. Reference numeral 3 denotes a table roll which is included in the conveying table 2. The table roll 3 is driven by a motor (not shown). The steel material 1 is mounted on the table roll 3, and is conveyed in a direction according to the rotational direction, by the rotation of the table roll 3. Reference numeral 4 denotes a speed detector for detecting the speed of the steel material 1 which is conveyed by the conveying table 2. The speed detector 4 detects a conveyance speed of the steel material 1 on the basis, for instance, of a rotational power of the table roll 3. The method for detecting the speed by the speed detector 4 is not limited to the above method. The speed detector 4 outputs the detected information on the speed to a power setting calculation device 7 and a power controlling device 8.

The steel material 1 is rolled, for instance, by a roughing mill (not shown) and a finishing mill 5 which is provided downstream from the roughing mill. The hot rolling line may not include the roughing mill. The induction heater 6 for heating the steel material 1 is arranged downstream from the roughing mill and upstream from the finishing mill 5. The induction heater 6 heats the steel material 1 by electromagnetic induction. The power setting calculation device 7 calculates an electric power necessary for the induction heater 6, and outputs the calculated electric power pattern to the power controlling device 8. The power controlling device 8 controls the electric power to be supplied to the induction heater 6 so that the electric power is supplied to the induction heater 6 according to the electric power pattern input from the power setting calculation device 7.

A temperature detector 9 detects the temperature of the steel material 1. The temperature detector 9 detects the surface temperature of the steel material 1 which passes through a certain position that is set upstream from the induction heater 6. The information on the temperature of the steel material 1 detected by the temperature detector 9 is input into the power setting calculation device 7.

The temperature detector 10 detects the temperature of the steel material 1. The temperature detector 10 detects the surface temperature of the steel material 1 which passes through a certain position that is set downstream from the induction heater 6 and upstream from the finishing mill 5. The temperature detector 10 detects the temperature of the steel material 1, for instance, at the time immediately before the steel material 1 enters the finishing mill 5. The information on the temperature of the steel material 1 detected by the temperature detector 10 is input into the power setting calculation device 7 and a temperature-rise pattern setting determination device 12.

A temperature detector 11 detects the temperature of the steel material 1. The temperature detector 11 detects the surface temperature of the steel material 1 which passes through a certain position that is set downstream from the finishing mill 5. The temperature detector 11 detects the temperature of the steel material 1, for instance, at the time immediately after the steel material 1 exits from the finishing mill 5. The information on the temperature of the steel material 1 detected by the temperature detector 11 is input into the temperature-rise pattern setting determination device 12.

The temperature-rise pattern setting determination device 12 is a device which is used for a factory worker or another person to determine the setting of a temperature-rise pattern before the steel material 1 is rolled. The information on the setting of the temperature-rise pattern, which is determined by the factory worker or another person, is output to the power setting calculation device 7 from the temperature-rise pattern setting determination device 12.

The information on the temperature detected by the temperature detector 10 and the information on the temperature detected by the temperature detector 11 are input into the temperature-rise pattern setting determination device 12 every time the steel material is rolled. The temperature-rise pattern setting determination device 12 stores the input information on the temperature in a memory (not shown). When determining the setting of the temperature-rise pattern, the factory worker or another person refers to the information on the temperature stored in the memory. In addition, the factory worker or another person determines the setting of the temperature-rise pattern on the basis of the type of the steel material 1, from the viewpoint of the threading performance of the steel material 1, the control of a finishing temperature and the control of the quality of the material.

The power setting calculation device 7 calculates the electric power pattern for the induction heater 6 on the basis of the temperature of the steel material 1 detected by the temperature detector 9, a precalculated or preset speed pattern of the steel material 1, and the setting of the temperature-rise pattern input from the temperature-rise pattern setting determination device 12. The power controlling device 8 calculates an electric power to be finally output, by correcting a deviation with the precalculated speed pattern of the steel material 1, with the use of the actual conveyance speed detected by the speed detector 4.

Figure 2:
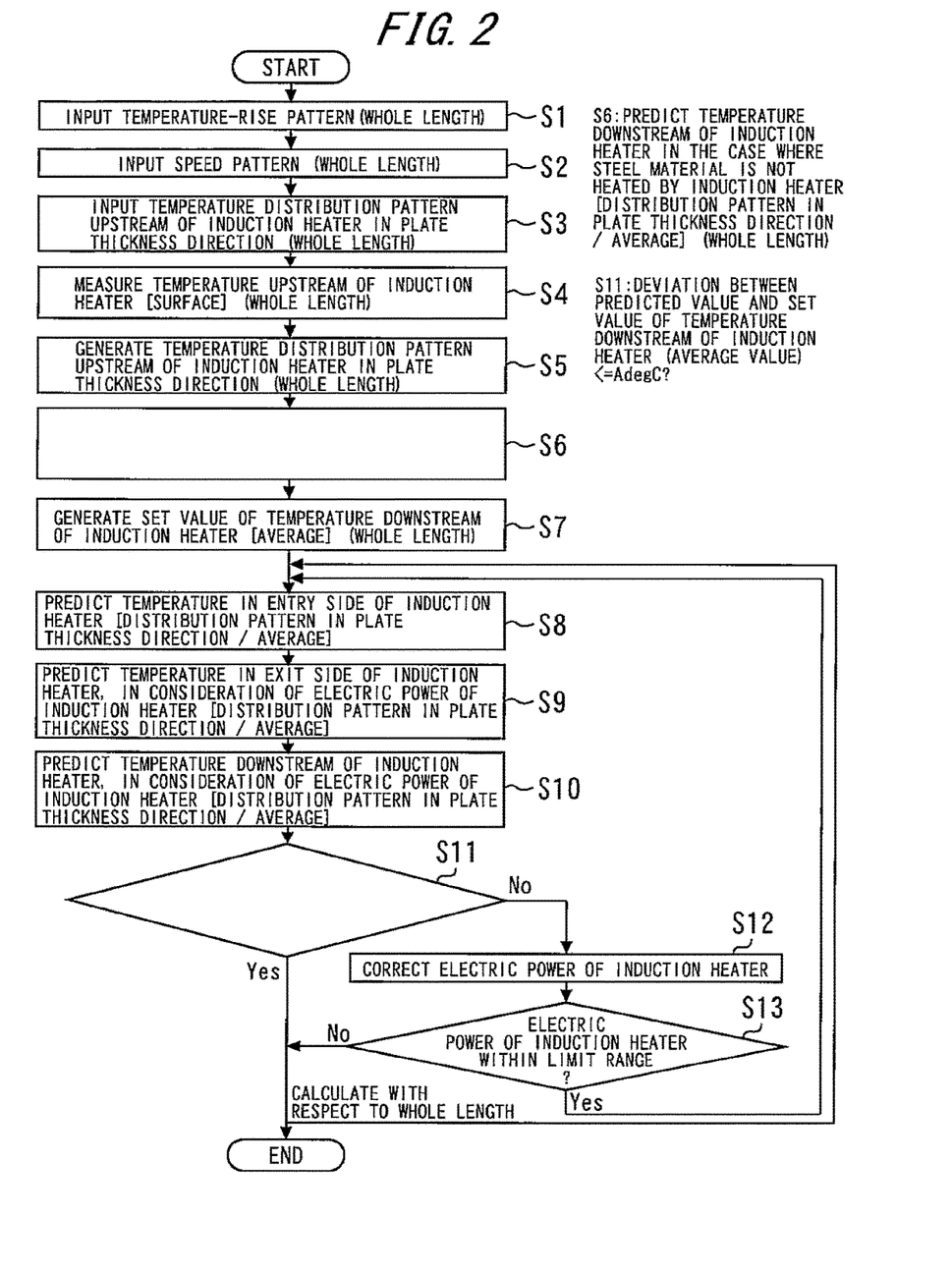
FIG. 2 is a flow chart showing an operation of a power setting calculation device.

Next, a function of the power setting calculation device 7 will be specifically described with reference to FIGS. 2 to 6. FIG. 2 is a flow chart showing an operation of the power setting calculation device 7. The power setting calculation device 7 performs processing shown in FIG. 2, and determines the electric power pattern for appropriately heating the whole length of the steel material 1 by the induction heater 6.

The power setting calculation device 7 firstly captures the setting of the temperature-rise pattern of the steel material 1 at a temperature control position in a downstream side, from the temperature-rise pattern setting determination device 12 (S1). The temperature control position in the downstream side is a position for controlling the temperature of the steel material 1. The temperature control position in the downstream side is set at a downstream side of the induction heater 6, for instance, at the entry side of the finishing mill 5. In the example shown in FIG. 1, the position at which the temperature detector 10 detects the temperature of the steel material 1 is set at the temperature control position in the downstream side.

The setting of the temperature-rise pattern is defined as an amount of a temperature (average temperature) increased from a predicted value of a temperature (average temperature) of the steel material 1 at the temperature control position in the downstream side. This predicted value of the temperature is an average temperature of the steel material 1 in the case where the steel material is not heated by the induction heater 6. The setting of the temperature-rise pattern captured by the power setting calculation device 7 in S1 is information as deviation. The power setting calculation device 7 acquires the setting of the temperature-rise pattern with respect to the whole length of the steel material 1, in S1.

Incidentally, the average temperature of the steel material 1 is given by the following formula. The average temperature means a temperature determined from temperatures of internal nodes of the steel material 1 according to a volume average.

$$T_{va} = \frac{\sum_i V_i \cdot T[i]}{\sum_i V_i}$$ [Expression 1]

Here,
$T_{va}$: volume average temperature
$T[i]$: temperature of node i
$V_i$: volume of node i, and
i: node number (1, 2, . . . and 2N−1).

Figure 3:
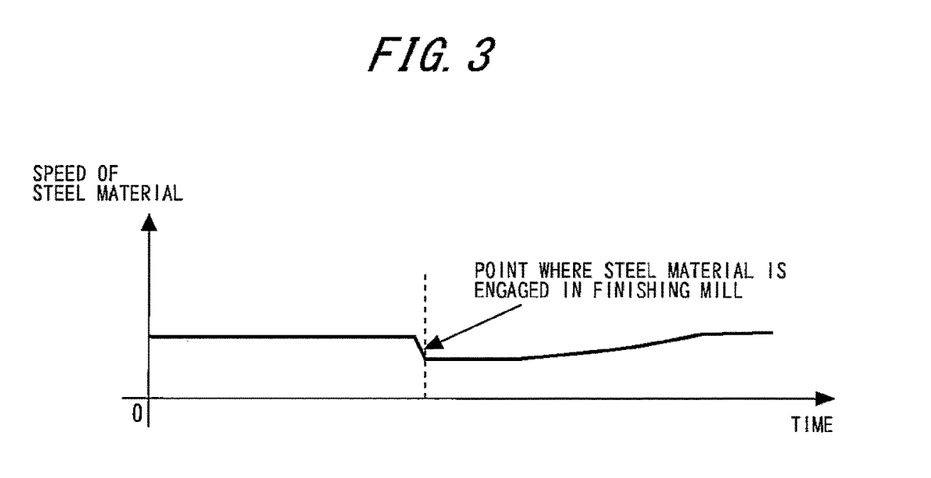
FIG. 3 shows an example of a speed pattern of a steel material right under the induction heater.

The power setting calculation device 7 captures the speed pattern of the steel material 1, in S2. FIG. 3 shows an example of a speed pattern of the steel material 1 right under the induction heater 6, at the time when the steel material is conveyed by the conveying table 2. The speed pattern of the steel material 1 down to the finishing mill 5 from the roughing mill (or induction heater 6) can be previously calculated according to a simple procedure. When the head is engaged in the finishing mill 5, the speed of the steel material 1 depends on the speed of the finishing mill 5. Because of this, when the head is engaged in the finishing mill 5, the speed pattern of the steel material 1 is generally changed in a decelerating direction. In addition, the speed pattern of the steel material 1 after that is changed in an accelerating direction along with the acceleration of the finishing mill 5. The power setting calculation device 7 acquires the speed pattern with respect to the whole length of the steel material 1, in S2.

The power setting calculation device 7 captures a temperature distribution pattern in a plate thickness direction of the steel material 1 at a temperature control position in an upstream side, in S3. The temperature control position in the upstream side is a position for controlling the temperature of the steel material 1. The temperature control position in the upstream side is set upstream of the induction heater 6. In the example shown in FIG. 1, the position at which the temperature detector 9 detects the temperature of the steel material 1 is set at the temperature control position in the upstream side.

The power setting calculation device 7 captures a temperature (actual value) of the steel material 1 measured at the temperature control position in the upstream side, in S4. Specifically, the power setting calculation device 7 captures the surface temperature of the steel material 1 detected by the temperature detector 9, as the actual value of the temperature of the steel material 1, in S4. The power setting calculation device 7 acquires the surface temperature with respect to the whole length of the steel material 1, in S4.

Figure 4:
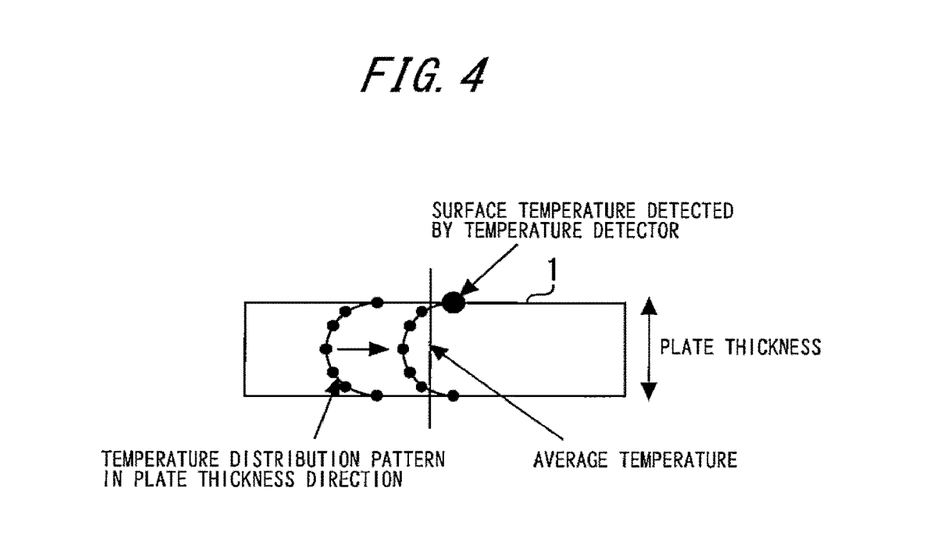
FIG. 4 shows an example of a method of generating a temperature distribution pattern based on an actual value of a temperature of the steel material.

In S5, the power setting calculation device 7 generates a temperature distribution pattern in a plate thickness direction of the steel material 1 at the temperature control position in the upstream side, by using the temperature distribution pattern acquired in S3, and the actual value of the temperature acquired in S4. The temperature distribution pattern which is generated in S5 is not only information which provides the deviation, but also information in which the actual temperature of the steel material 1 is taken into consideration. FIG. 4 shows an example of a method of generating a temperature distribution pattern based on the actual value of the temperature of the steel material 1. The power setting calculation device 7, for instance, makes a temperature in a portion corresponding to the surface of the steel material 1 out of the temperature distribution pattern acquired in S3 coincide with the surface temperature detected by the temperature detector 9, and thereby generates a temperature distribution pattern based on the actual value of the temperature. The power setting calculation device 7 generates the temperature distribution pattern in the plate thickness direction with respect to the whole length of the steel material 1, in S5.

The power setting calculation device 7 calculates the change of the temperature of the steel material 1, at the time when the steel material 1 moves to the temperature control position in the downstream side from the temperature control position in the upstream side, in S6. At this time, the temperature distribution pattern generated in S5 is used as a temperature of the steel material 1 at the temperature control position in the upstream side. The predicted value of the temperature (average temperature) calculated by the power setting calculation device 7 in S6 is a temperature at the temperature control position in the downstream side, at the time when the steel material is not heated by the induction heater 6. The power setting calculation device 7 predicts temperatures with respect to the whole length of the steel material 1, in S6.

Figure 5:
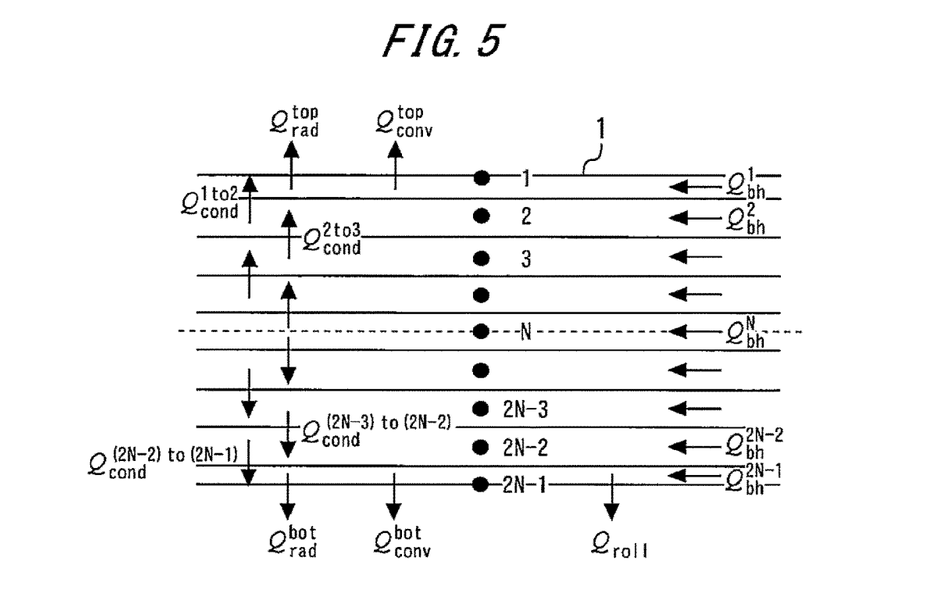
FIG. 5 shows an example of node division in a cross section of the steel material.

In the calculation for the temperature prediction of the steel material 1, a finite difference method is applied to a non-steady heat conduction equation; and the predicted value of the temperature is calculated by discretizing the non-steady heat conduction equation in terms of, for instance, a space in a cross section of the steel material 1 and a conveyance time period on a conveying line. FIG. 5 shows an example of node division of the steel material 1. As is shown in FIG. 5, the steel material 1 is divided in a plate thickness direction by 2N−1 pieces of nodes (elements). In addition, a longitudinal direction of the steel material 1 is divided into segments (cut plates) each having a fixed length. The power setting calculation device 7 calculates the temperatures of each of the segments in the plate thickness direction, and thereby predicts temperatures with respect to the whole length of the steel material 1.

Figure 6:
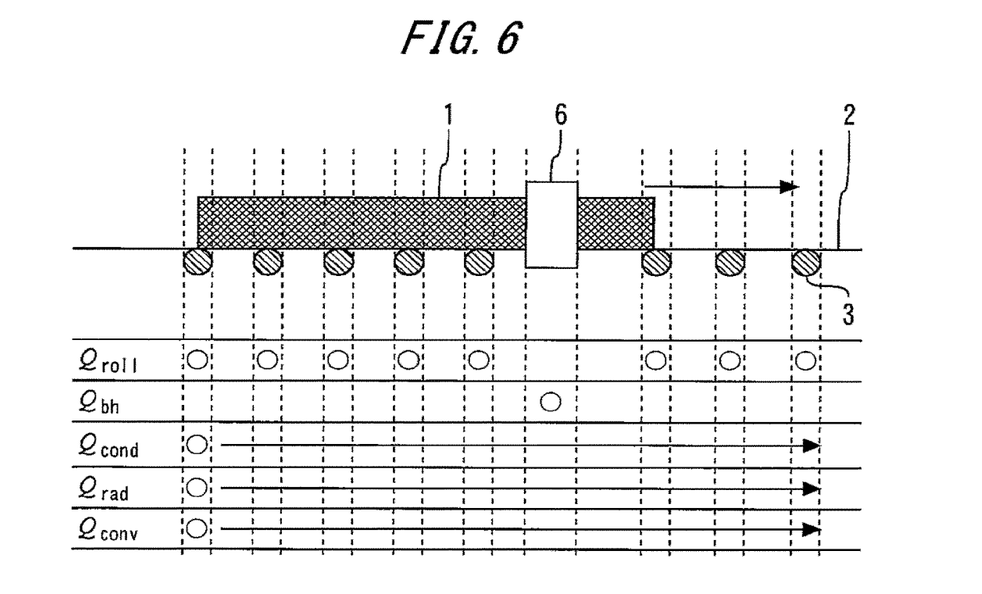
FIG. 6 shows elements of the calorific value, which must be considered in each position of facilities.

In the calculation for the temperature prediction, in the node arranged in the most outer side, heat transfer is considered that heat is conducted to the outside through the surface of the steel material 1. Specifically, in regard to the node 1 and the node 2N−1, radiation cooling $Q_{rad}$, air cooling (escape of heat due to air convection) $Q_{conv}$, and escape of heat $Q_{roll}$ the table roll 3 are considered. In addition, in each of the nodes (which include the nodes that are arranged in the most outer side), heat conduction $Q_{cond}$ which occurs due to a temperature difference between the node and its adjacent node, and a change $Q_{bh}$ of calorific value from the induction heater 6 are considered. When the steel material is not heated by the induction heater 6, the temperature may be calculated on the basis of $Q_{bh}=0$. FIG. 6 shows elements of the calorific value, which must be considered in each position of facilities. When having calculated the change of the temperature in each of the nodes, the power setting calculation device 7 calculates the predicted value of the temperature (average temperature) on the basis of the calculated result.

$$\Delta Q_1 = -Q_{rad}^{top} - Q_{conv}^{top} - Q_{cond}^{1to2} + Q_{bh}^{\ i}$$

$$\Delta Q_{2N-1} = -Q_{rad}^{bot} - Q_{conv}^{bot} - Q_{roll} - Q_{cond}^{(2N-2)to(2N-1)} + Q_{bh}^{2N-1}$$ [Expression 2]

Here, $\Delta Q_1$: calorific value flowing into node 1 during time interval $\Delta t$, $\Delta Q_{2N-1}$: calorific value flowing into node 2N−1 during time interval $\Delta t$, $Q_{rad}^{top}$, $Q_{rad}^{bot}$: calorific value flowing out due to radiation from upper face and lower face of steel material 1, $Q_{conv}^{top}$, $Q_{conv}^{bot}$: calorific value flowing out due to convection from upper face and lower face of steel material 1 in air cooling region, $Q_{roll}$: escape of heat due to roll from lower face of steel material 1 to table roll 3, $Q_{bh}^i$: change of calorific value from induction heater 6 to node i, $Q_{cond}^{1to2}$: amount of heat conduction from node 1 to node 2 due to temperature difference, and $Q_{cond}^{(2N-2)to(2N-1)}$: amount of heat conduction from node 2N−2 to node 2N−1 due to temperature difference.

The above described calorific value flowing out due to radiation, calorific value flowing out due to convection, escape of heat due to roll, and amount of heat conduction are each calculated with the use of theoretical formulae which a used in a general heat transfer theory and a general rolling theory.

Next, the power setting calculation device 7 generates a temperature pattern set value of the steel material 1 at the temperature control position in the downstream side (S7). The temperature pattern set value generated in S7 is a target temperature of the steel material 1 at the temperature control position in the downstream side. The power setting calculation device 7 adds the setting of the temperature-rise pattern (average temperature) acquired in S1 to the predicted value of the temperature (average temperature) calculated in S6, and thereby calculates the temperature pattern set value (average temperature). The power setting calculation device 7 calculates the temperature pattern set values, for instance, for each of the segments, and thereby calculates the temperature pattern set values with respect to the whole length of the steel material 1.

The power setting calculation device 7 calculates the temperature (average temperature) of the steel material 1 in the entry side of the induction heater 6, in S8. The temperature in the entry side of the induction heater 6 means a temperature at the time immediately before the steel material 1 enters the induction heater 6. At this time, the power setting calculation device 7 uses the temperature distribution pattern generated in S5, as a temperature of the steel material 1 at the temperature control position in the upstream side.

In addition, the power setting calculation device 7 calculates the temperature (average temperature) of the steel material 1 in the exit side of the induction heater 6, in S9. The temperature in the exit side of the induction heater 6 means a temperature at the time immediately after the steel material 1 exits from the induction heater 6. The power setting calculation device 7 predicts the temperature of the steel material 1 in the exit side of the induction heater 6, on the basis of the predicted value of the temperature obtained in S8 and the electric power that is supplied to the induction heater 6.

The power setting calculation device 7 calculates the temperature (average temperature) of the steel material 1 at the temperature control position in the downstream side, in S10. The power setting calculation device 7 predicts the temperature of the steel material 1 at the temperature control position in the downstream side, on the basis of the predicted value of the temperature obtained in S9. The predicted value of the temperature obtained in S10 is a value in the case where the electric power which is supplied to the induction heater 6 is considered.

Specifically, the power setting calculation device 7 obtains the predicted value of the temperature (average temperature) of the steel material 1 at the temperature control position in the downstream side, at the time when the steel material 1 moves to the temperature control position in the downstream side from the temperature control position in the upstream side, from the processing shown in S8 to S10. This predicted value is a value at the time when the steel material 1 is heated by the induction heater 6 with the set electric power.

The calculation in S8 to S10 can be performed by a combination of the above described temperature calculations. The change of the calorific value from the induction heater 6 to the node i is calculated, for instance, according to the following expression.

$$Q_{bh}^i = R_{base}[i] \cdot \overline{p_2} \qquad \text{[Expression 3]}$$
$$\overline{p_2} = \frac{C}{2N-1} \Delta T_{bh} \cdot S \cdot V \cdot \rho \cdot c_p$$

Here, $Q_{bh}^i$: change of calorific value from induction heater 6 to node i, $R_{base}[i]$: coefficient of penetration depth, $\overline{p_2}$: average value of change of calorific value to node, $\Delta T_{bh}$: required change of temperature from entry side to exit side of induction heater 6, S: cross-sectional area of steel material 1, V: speed of steel material 1, $\rho$: density of steel material 1, $C_p$: specific heat of steel material 1, and C: coefficient.

A coefficient of a penetration depth represents a penetration depth of an electric current. The coefficient of the penetration depth can be determined by using, for instance, a cubic function expressed in the following expression.

$$R_{base0}[i] = \qquad \text{[Expression 4]}$$
$$\begin{cases} C_3 \cdot x[i]^3 + C_2 \cdot x[i]^2 + C_1 \cdot x[i] + C_0 & ; i <= N \\ C_3 \cdot x[2N-i]^3 + C_2 \cdot x[2N-i]^2 + \\ C_1 \cdot x[2N-i] + C_0 & ; i > N \end{cases}$$

$$R_{base1}[i] = \begin{cases} R_{base0}[i] & ; R_{base0}[i] > 0 \\ 0 & ; R_{base0}[i] \le 0 \end{cases}$$

$$R_{base}[i] = \frac{R_{base1}[i]}{\underset{k}{\text{Ave}}\{R_{base1}[k]\}}$$

Here, i: node number (1, 2, . . . and 2N−1), $C_k$: parameter, and x[i]: depth from the surface of the node i.

The power setting calculation device 7 compares the volume average temperature of the steel material 1 determined in S10, with the temperature pattern set value generated in S7, and determines the deviation in S11. The power setting calculation device 7 determines whether the determined deviation is within a specified range or not. When the determined deviation is outside of the specified range (No in S11), the power setting calculation device 7 corrects the set value of the electric power for the induction heater 6 (S12).

Next, the power setting calculation device 7 determines whether the electric power of the induction heater 6, which is corrected in S12, is within a limited range or not (S13). When the electric power of the induction heater 6 is within the limited range (Yes in S13), the power setting calculation device 7 performs the calculations of S8 to S10 again, on the basis of the electric power of the induction heater 6, which is reset in S12. The power setting calculation device 7 repeats the processing shown in S8 to S13 until the deviation between the volume average temperature of the steel material 1 determined in S10 and the temperature pattern set value generated in S7 enters the specified range.

The power setting calculation device 7 performs the processing shown in S8 to S13 on the whole length of the steel material 1. For instance, the power setting calculation device 7 performs is processing shown in S8 to S13 on a segment j (where j is segment number). When the deviation becomes within the specified range in S11, the power setting calculation device 7 ends the processing for the segment j, and sets the electric power at the time point at an electric power for the segment j. In addition, the power setting calculation device 7 ends the processing for the segment j, also when the electric power of the induction heater 6 is outside of the limited range in S13, and sets the electric power at the time point at an electric power for the segment j. After the processing for the segment j is ended, the power setting calculation device 7 starts processing for a segment j+1. When the electric power of the induction heater 6 is set with respect to the whole length (all segments) of the steel material 1, the power setting calculation device 7 outputs the set electric power pattern to the power controlling device S.

According to the above described configuration, the controlling device can accurately determine an electric power pattern of the induction heater 6 necessary for achieving a desired setting of a temperature-rise pattern. Specifically, the controlling device can appropriately control the induction heater 6 so that the steel material 1 becomes the optimal temperature in the entry side of the finishing mill 5. Thereby, the rolling system can enhance the quality of the product, and can raise an additional value.

Incidentally, the power setting calculation device 7 calculates the volume average temperature over the whole length of the steel material 1, by using a preset speed pattern as a conveyance speed of the steel material 1, before the steel material 1 is rolled by the finishing mill 5. In addition, after rolling of the material by the finishing mill 5 is started, the power setting calculation device 7 calculates the volume average temperature over the whole length of the steel material 1, by using the speed detected by the speed detector 4, as the conveyance speed of the steel material 1. Alternatively, the power setting calculation device 7 may use both of the speed detected by the speed detector 4 and the preset speed pattern, as the conveyance speed of the steel material 1. It is also acceptable to change a ratio between both the above described speed and the pattern, with a lapse of time, and to use the obtained value as the conveyance speed of the steel material 1.

Incidentally, the power setting calculation device 7 has, for instance, circuitry including an input/output interface, a CPU and a memory, as a hardware resource. The power setting calculation device 7 executes a program stored in the memory by the CPU, and thereby achieves each processing (function) shown in FIG. 2. The power setting calculation device 7 may achieve a part or all of each of the functions shown in FIG. 2, which the power setting calculation device 7 has, by the hardware.

Embodiment 2

Figure 7:
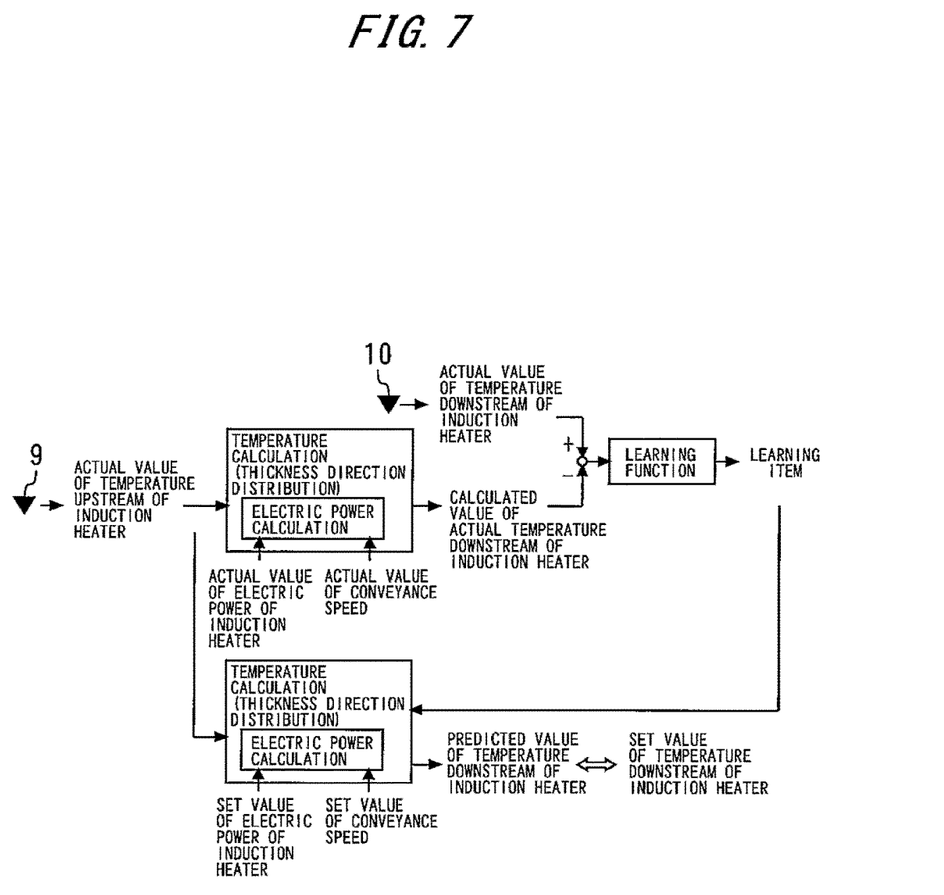
FIG. 7 is a diagram showing a configuration of an essential part of a rolling system in Embodiment 2 of the present invention.

FIG. 7 is a diagram showing a configuration of an essential part of a rolling system in Embodiment 2 of the present invention. In the present embodiment, the case will be described below in which the power setting calculation device 7 has a learning function.

A series of temperature calculations at the time when the steel material 1 moves to a temperature control position in an downstream side from a temperature control position in an upstream side will be described below, which have been described in Embodiment 1. The following expression expresses temperature calculation at the time when the steel material 1 is heated by the induction heater 6.

$$T_{FE}^{CAL}(1,2,\ldots,2N-1) = \text{temp\_cal}\{T_{RD}^{ACT}(1,2,\ldots,2N-1), V_{pattern}, P_{bh}\} \quad \text{[Expression 5]}$$

Here, $T_{FE}^{CAL}(1, 2, \ldots, 2N-1)$: calculated values of temperature in temperature control position in downstream side (information on all nodes), $T_{RD}^{ACT}(1, 2, \ldots, 2N-1)$: actual values of temperature measured at temperature control position in upstream side (information on all nodes), $V_{pattern}$: speed pattern of steel material 1 (speed information at each time), and $P_{bh}$: electric power of induction heater 6.

Temp_cal{ } expresses a series of calculation formulae in which a finite difference method is applied to the non-steady heat conduction equation, and the non-steady heat conduction equation has been discretized in terms of a space in a cross section of the steel material 1 and a conveyance time period on a conveyance line, which have been described in Embodiment 1. Before the steel material 1 is rolled, the power setting calculation device 7 calculates the temperature (information on all nodes) of the steel material 1 at the temperature control position in the downstream side, by using actual values of the temperature (information on all nodes) at the temperature control position in the upstream side, the speed pattern (speed information at each time) of the steel material 1 and the electric power set value of the induction heater 6, as input information. This temperature is called "calculated value of temperature" here.

On the other hand, also after the steel material 1 has been rolled, according to a similar calculation method, the power setting calculation device 7 can calculate the temperature (information on all nodes) of the steel material 1 at the temperature control position in the downstream side, by using the actual values of the temperature (information on all nodes) at the temperature control position in the upstream side, the actual value of the speed pattern (speed information at each time) of the steel material 1 and the actual value of the electric power of the induction heater 6, as input information. This temperature is called as "calculated value of actual temperature" here.

$$T_{FE}^{ACAL}(1,2,\ldots,2N-1) = \text{temp\_cal}\{T_{RD}^{ACT}(1,2,\ldots,2N-1), V_{pattern}^{ACT}, P_{bh}^{ACT}\} \quad \text{[Expression 6]}$$

Here, $T_{FE}^{ACAL}(1, 2, \ldots, 2N-1)$: calculated values of actual temperatures in temperature control position in downstream side (information on all nodes), $T_{RD}^{ACT}(1, 2, \ldots, 2N-1)$: actual values of temperatures measured at temperature control position in upstream side (information on all nodes),
$V_{pattern}^{ACT}$: actual value of speed pattern of steel material 1 (speed information at each time), and
$P_{bh}^{ACT}$: actual value of electric power of induction heater 6.

In addition, the actual value of the temperature at the temperature control position in the downstream side can be obtained from the temperature detector 10.
$T_{FE}^{ACT}(1)$: actual value of temperature at temperature control position in downstream side (surface temperature)

Consequently, a prediction error of a temperature calculation temp_cal{ } can be obtained by comparing the calculated value of the actual temperature $T_{FE}^{ACT}(1)$ with the actual value of the temperature $T_{FE}^{ACT}(1)$.

$$\Delta T_{err} = T_{FE}^{ACAL}(1) - T_{FE}^{ACT}(1) \quad \text{[Expression 7]}$$

The learning item that the obtained predicted error is subjected to smoothing processing shall be represented by $Z_{fet}$, and is added to the final result of the temperature calculation temp_cal{ }. Specifically, a new temperature calculation is expressed by the following expression.

$$\text{temp\_cal\_new}\{\ \} = \text{temp\_cal}\{\ \} + Z_{fet} \quad \text{[Expression 8]}$$

For instance, after the rolling of the steel material 1 is ended, the learning item $Z_{fet}$ is associated with the type of the steel material 1 and is recorded. When the steel material having the same type is rolled next time, the power setting calculation device 7 may read out and use this recorded learning item $Z_{fet}$. Incidentally, the using method of the learning item $Z_{fet}$ is not limited to this method.

According to the above described configuration, the controlling device can appropriately correct a parameter necessary for the calculation of the electric power pattern, by using the temperature and the speed of the steel material 1 and each of the actual values of the electric power of the induction heater 6, after the steel material 1 is rolled. Specifically, the power setting calculation device 7 firstly calculates the surface temperature of the steel material 1 at the temperature control position in the downstream side, on the basis of the temperature of the steel material 1 detected by the temperature detector 9 and the electric power actually supplied to the induction heater 6. Then, the power setting calculation device 7 corrects a parameter which is used when the volume average temperature is calculated, on the basis of the calculated surface temperature and the temperature of the steel material 1 detected by the temperature detector 10. Thereby, the power setting calculation device 7 can accurately determine the electric power pattern when the induction heater 6 performs the heating treatment next time.

INDUSTRIAL APPLICABILITY

The present invention can be applied to a rolling system which includes an induction heater.

REFERENCE SIGNS LIST

1 steel material (material)
2 conveying table
3 table roll
4 speed detector
5 finishing mill
6 induction heater
7 power setting calculation device
8 power controlling device
9, 10, 11 temperature detector
12 temperature-rise pattern setting determination device

The invention claimed is:

1. A rolling system comprising:
   an induction heater which heats a material that is conveyed by a conveying table;
   a first temperature detector which detects a first temperature of the material at a first position upstream from the induction heater;
   a finishing mill which is provided downstream from the induction heater, and rolls the material;
   a second temperature detector which detects a second temperature of the material at a second position downstream from the induction heater and upstream from the finishing mill; and
   a power setting calculation device which includes circuitry, wherein the circuitry:
   generates a temperature distribution pattern in a plate thickness direction of the material at the first position, based on the temperature detected by the first temperature detector;
   calculates a volume average temperature of the material at the second position, at a time when the material moves to the second position from the first position, based on the generated temperature distribution pattern; and
   calculates an electric power necessary for the induction heater so that the calculated volume average temperature follows a target temperature of the material at the second position, wherein the circuitry:
   divides the material into nodes in the plate thickness direction;
   calculates a change of a temperature of each node based on radiation cooling, escape of heat due to air convection, escape of heat to a table roll of the conveying table, heat conduction occurring due to a temperature difference between the node and its adjacent node, and a change of a calorific value from the induction heater; and
   calculates, based on the calculated result, the volume average temperature of the material corresponding to a value obtained by dividing a sum of products of a volume and a temperature of each node by a sum of volumes of each node.

2. The rolling system according to claim 1, further comprising:
   a speed detector which detects a speed of the material that is conveyed by the conveying table, wherein
   the circuitry calculates:
   the volume average temperature over the whole length of the material, by using a preset predicted speed pattern as a conveyance speed of the material, before the material is rolled by the finishing mill; and
   the volume average temperature over the whole length of the material, by using the speed detected by the speed detector, or using both of the speed detected by the speed detector and the predicted speed pattern, as the conveyance speed of the material, after the rolling of the material by the finishing mill is started.

3. The rolling system according to claim 1, further comprising:
   a temperature-rise pattern setting determination device for determining setting of a temperature-rise pattern, wherein
   the temperature-rise pattern setting determination device includes a memory storing information on the temperature detected by the second temperature detector; and the circuitry sets the target temperature of the material at the second position, based on the volume average temperature of the material at the second position, at a time when the material is not heated by the induction heater, and the setting of the temperature-rise pattern determined by the temperature-rise pattern setting determination device.

4. The rolling system according to claim 3, wherein the circuitry calculates the volume average temperature of the material at the second position, at the time when the material is not heated by the induction heater, based on the generated temperature distribution pattern.

5. The rolling system according to claim 3, wherein
the second position is a position close to an entry side of the finishing mill;
the circuitry divides the material into segments each having a fixed length in a longitudinal direction, and calculates a volume average temperature for each of the segments; and
the circuitry sets a target temperature for each of the segments of the material.

6. The rolling system according to claim 1, wherein the circuitry resets a value of an electric power used when the volume average temperature is calculated, and recalculate the volume average temperature, in a case where a difference between the calculated volume average temperature and the target temperature of the material at the second position is outside of a reference range.

7. The rolling system according to claim 1, further comprising:
a speed detector which detects a speed of the material that is conveyed by the conveying table, wherein
the circuitry calculates a surface temperature of the material at the second position based on the temperature detected by the first temperature detector, the speed detected by the speed detector, and an electric power actually supplied to the induction heater; and corrects a parameter used when the volume average temperature is calculated, based on the calculated surface temperature and the temperature detected by the second temperature detector.

* * * * *